UNITED STATES PATENT OFFICE.

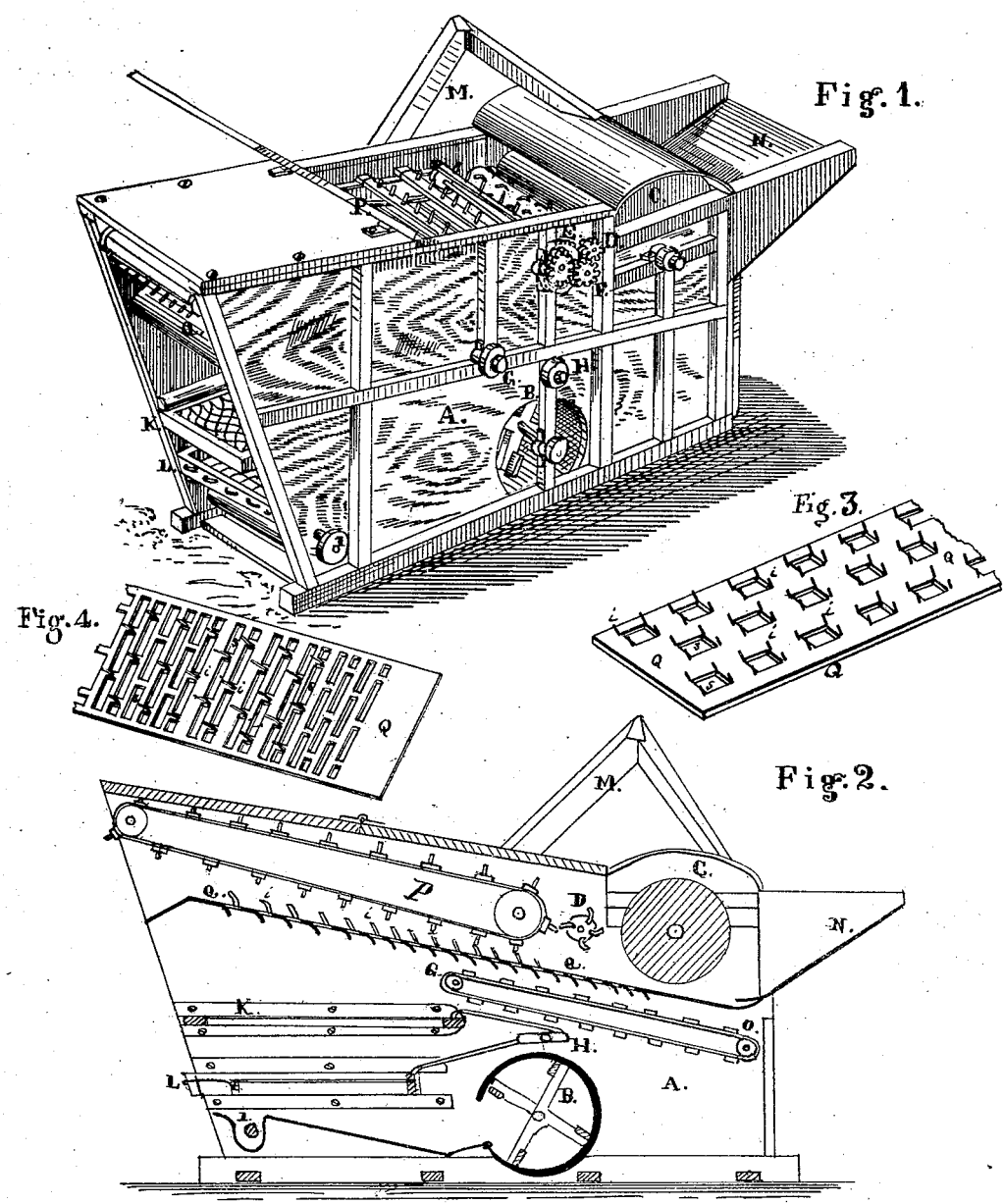

JOHN SMITH, OF BURLINGTON, WISCONSIN.

IMPROVEMENT IN THRASHING-MACHINES.

Specification forming part of Letters Patent No. 144,874, dated November 25, 1873; application filed July 29, 1872.

*To all whom it may concern:*

Be it known that I, JOHN SMITH, of Burlington, in the county of Racine and the State of Wisconsin, have invented certain Improvements in Thrasher and Grain-Separator, of which the following is a specification:

The object of my invention is to produce a machine which will thrash grain to a greater advantage than heretofore; and consists in the use of a long stationary sieve, having upright projections or teeth arranged in relation to the thrashing-cylinder and carriers or conveyers, as more particularly hereinafter described by the description and drawings making a part of this specification, in which—

Figure 1 is a perspective view of my machine. Fig. 2 is a vertical sectional view. Fig. 3 is a detached view of a modification of the sieve. Fig. 4 is a detached view of the sieve.

In the said drawings, A is the body of the machine, in which are arranged, in the manner shown, the fan B; thrashing-cylinder C; the toothed wheel D, which carries the straw from the cylinder to the straw-conveyer; the grain-conveyer O; sieves K L; elevator M, and straw-conveyer P, all operated by suitable cogs and rollers in the usual manner. Just below the straw-conveyer P I locate a long stationary sieve, Q, which has projecting from its surface, upwardly, teeth $i$, which rake in the direction of the travel of the straw-conveyer, and are located alternately along between the rectangular meshes, as seen in Fig. 4.

Fig. 5 is a modification of the sieve, showing the teeth only slightly raking.

This sieve has large rectangular openings or meshes $s$ in it, and by its location and construction, the teeth on the straw-conveyer passing between the teeth on the sieve, a more thorough and positive agitation of the straw takes place, so that all the grain is shaken out.

Having described my invention, what I claim as my invention, and desire to secure by Letters Patent, is—

The stationary sieve Q, constructed as described, and arranged beneath the conveyer P, in combination with the toothed wheel D and thrashing-cylinder C, all constructed, arranged, and operated as described.

JOHN SMITH.

Witnesses:
  A. E. WELLS,
  E. N. WHITE.